US010371960B2

(12) United States Patent
Hu et al.

(10) Patent No.: US 10,371,960 B2
(45) Date of Patent: Aug. 6, 2019

(54) LENS DRIVING APPARATUS

(71) Applicant: TDK TAIWAN CORPORATION, Taipei (TW)

(72) Inventors: Chao-Chang Hu, Taipei (TW); Fu-Yuan Wu, Taipei (TW); Yi-Lang Chan, Taipei (TW)

(73) Assignee: TDK Taiwan Corporation, Taipei (TW)

( * ) Notice: Subject to any disclaimer, the term of this patent is extended or adjusted under 35 U.S.C. 154(b) by 126 days.

(21) Appl. No.: 15/705,725

(22) Filed: Sep. 15, 2017

(65) Prior Publication Data

US 2018/0004007 A1 Jan. 4, 2018

Related U.S. Application Data

(62) Division of application No. 15/045,807, filed on Feb. 17, 2016, which is a division of application No. (Continued)

(30) Foreign Application Priority Data

Nov. 17, 2009 (JP) .................................. 2009-262218
Oct. 5, 2010 (JP) .................................. 2010-108621

(51) Int. Cl.
*G02B 7/04* (2006.01)
*G02B 7/08* (2006.01)
(Continued)

(52) U.S. Cl.
CPC ............. *G02B 27/646* (2013.01); *G02B 7/04* (2013.01); *G02B 7/08* (2013.01); *G03B 3/10* (2013.01);
(Continued)

(58) Field of Classification Search
CPC ........ G02B 27/646; G02B 27/64; G02B 7/04; G02B 7/08; G02B 7/02; G02B 7/023;
(Continued)

(56) References Cited

U.S. PATENT DOCUMENTS 5,680,251 A 10/1997 Kato et al.
6,421,191 B1 7/2002 Nagasaka et al.
(Continued)

FOREIGN PATENT DOCUMENTS

CN 1301012 6/2001
JP 62-84437 4/1987
(Continued)

OTHER PUBLICATIONS

U.S. Appl. No. 15/705,607, filed Sep. 15, 2017.
U.S. Appl. No. 15/705,665, filed Sep. 15, 2017.

*Primary Examiner* — Collin X Beatty
(74) *Attorney, Agent, or Firm* — Muncy, Geissler, Olds & Lowe, P.C.

(57) ABSTRACT

A lens driving apparatus with a lens portion having at least one lens, a base portion on which an image sensor detecting light coming through said lens portion can be fixed, a driving portion capable of relatively moving said lens portion in a vertical direction to a light axis of said lens portion and in a parallel direction to the light axis of said lens portion with respect to said base portion, and at least three suspension wires connecting a focus portion including said lens portion and said base portion so as to allow a relative movement. The suspension wires are arranged outside a magnet of said driving portion along the vertical direction to the light axis.

11 Claims, 5 Drawing Sheets

Related U.S. Application Data

13/956,826, filed on Aug. 1, 2013, now Pat. No. 9,298,016, which is a division of application No. 12/948,380, filed on Nov. 17, 2010, now Pat. No. 8,531,534.

(51) Int. Cl.
*G03B 3/10* (2006.01)
*G02B 27/64* (2006.01)
*H04N 5/232* (2006.01)
*H02K 41/035* (2006.01)

(52) U.S. Cl.
CPC ..... *H02K 41/0356* (2013.01); *H04N 5/23248* (2013.01)

(58) Field of Classification Search
CPC .............. G03B 3/10; G03B 2205/0069; G03B 2205/0007; G03B 2205/0015; H02K 41/0356; H04N 5/23248
USPC ........................................ 359/557, 554, 824
See application file for complete search history.

(56) References Cited

U.S. PATENT DOCUMENTS

| | | | |
|---|---|---|---|
| 6,940,542 B2 | 9/2005 | Kitazawa et al. | |
| 7,076,791 B2 | 7/2006 | Mori et al. | |
| 7,161,621 B2 | 1/2007 | Kai et al. | |
| 7,327,952 B2 | 2/2008 | Enomoto et al. | |
| 7,502,554 B2 | 3/2009 | Enomoto | |
| 7,576,778 B2 | 8/2009 | Hirota et al. | |
| 7,612,957 B1* | 11/2009 | Wu ........................ | G02B 7/08 359/819 |
| 2002/0163581 A1 | 11/2002 | Kitazawa et al. | |
| 2003/0117934 A1 | 6/2003 | Mori et al. | |
| 2006/0017815 A1 | 1/2006 | Stavely et al. | |
| 2006/0017818 A1 | 1/2006 | Enomoto | |
| 2006/0275032 A1 | 12/2006 | Hong et al. | |
| 2007/0014555 A1 | 1/2007 | Hirunuma et al. | |
| 2007/0035860 A1 | 2/2007 | Adachi et al. | |
| 2007/0236577 A1 | 10/2007 | Ke et al. | |
| 2007/0297055 A1 | 12/2007 | Enomoto et al. | |
| 2009/0060485 A1 | 3/2009 | Takahashi | |
| 2010/0316363 A1* | 12/2010 | Chou .................... | G02B 27/646 396/55 |
| 2011/0096178 A1 | 4/2011 | Ryu et al. | |
| 2011/0103782 A1 | 5/2011 | Tsuruta et al. | |

FOREIGN PATENT DOCUMENTS

| | | |
|---|---|---|
| JP | 2002-208153 | 7/2002 |
| JP | 2003207708 | 7/2003 |
| JP | 2006-338004 | 12/2006 |
| JP | 2007-183488 | 7/2007 |
| JP | 2008-129470 | 6/2008 |
| JP | 2009-265210 | 11/2009 |
| JP | 2011102887 A | 5/2011 |
| KR | 10-0918816 | 9/2009 |
| WO | WO 2009/133691 | 11/2009 |

\* cited by examiner

LENS DRIVING APPARATUS

CROSS REFERENCE TO RELATED APPLICATIONS

This application is a Divisional of co-pending application Ser. No. 15/045,807 filed Feb. 17, 2016, which is a Divisional of application Ser. No. 13/956,826 filed Aug. 1, 2013 which issued as U.S. Pat. No. 9,298,016 on Mar. 29, 2016, which is a Divisional of application Ser. No. 12/948,380 filed on Nov. 17, 2010 which issued as Patent No. 8,531,534 on Sep. 10, 2013, for which priority is claimed under 35 U.S.C. §120; and this application claims priority of Application No. 2009-262218 filed in Japan on Nov. 17, 2009 and 2010-108621 filed in Japan on May 10, 2010 under 35 U.S.C. §119, the entire contents of all of which are hereby incorporated by reference.

BACKGROUND OF THE INVENTION

1. Field of the Invention

The present invention relates to a lens driving apparatus used for, for example, a camera module of mobile phone and the like.

2. Description of the Related Art

For a lens driving apparatus preferably used for a camera module of a mobile phone and the like, it has been suggested that a lens holder is sandwiched by a pair of ring shaped springs which are arranged at an axis direction so as to perform focusing action and the like (refer to JP Patent Laid Open No. 2004-280031).

In a lens driving apparatus according to a conventional art, a lens group supported by a lens holder can perform only focusing action, in order for giving other functions such as blurring compensation and the like to the lens driving apparatus, it was necessary to equip a lens group and the like for blurring compensation separately.

Therefore, in a conventional art, it has been difficult to realize a lens driving apparatus which is small size having multi functions.

SUMMARY OF THE INVENTION

The present invention has been made by considering this real scene, a purpose of the invention is to provide a lens driving apparatus which is small size having multi functions.

In order to achieve the above purpose, a lens driving apparatus according to the present invention comprises a lens portion having at least one lens, a first driving portion to cause a movement of said lens portion relatively to a base portion along a vertical direction of a light axis of said lens portion, and a second driving portion to cause a movement of said lens portion relatively to said base portion along said light axis.

Because a lens driving portion according to the present invention comprises the first driving portion to cause a movement of the lens portion along the vertical direction of the light axis and the second driving portion to causes a movement of the lens portion along the light axis, the lens portion is capable to combine a lens for focus adjusting and a lens for blurring compensation. Therefore, the lens driving apparatus according to the present invention can realize a small size and multi functional lens driving apparatus.

Also, for example, the lens driving apparatus according to the present invention may comprise a focus portion having said lens portion and said second driving portion, wherein said first driving portion causes a movement of said focus portion relatively to said base portion along the vertical direction of said light axis.

Because the first driving portion in the lens driving apparatus of the present invention causes a movement of a whole focus portion including the lens portion and the second driving portion, it is possible to simplify structures of the first driving portion and the second driving portion. Also, the first driving portion causes a movement of the whole focus portion along the vertical direction to the light axis, and the second driving portion causes a movement of the lens portion along the light axis, as a result, the lens portion is caused a movement of three dimensional directions. The lens driving apparatus like this can be easily controlled, as compared with the lens portion moved to three dimensional directions directly.

Also, for example, said first driving portion may include a first magnet mounted to said focus portion, and a first coil mounted to said base portion and arranged to face said first magnet.

Because the first driving portion in the lens driving apparatus comprises a voice coil motor composed of the first magnet and the first coil, the lens portion included in the focus portion can be moved along the vertical direction to the light axis accurately.

Also, for example, the lens driving apparatus according to the present invention may comprise at least three suspension wires, and said focus portion and said base portion may be connected so as to allow a relative movement by the at least three suspension wires.

In the lens driving apparatus like this, because the focus portion and the base portion are connected so as to allow a relative movement by the at least three suspension wires, a structure thereof is simple.

Also, for example, said focus portion may comprise a focus base able to be moved relatively to said base portion by said first driving portion and a spring connecting said lens portion movably relatively to said focus base, said second driving portion may comprise a second coil equipped to said lens portion and a second magnet equipped to said focus base and arranged to face said second coil.

The second driving portion in the lens driving apparatus like this is able to move the lens portion included in the focus portion along the light axis accurately, because the second driving portion comprises a voice coil motor composed of the second magnet and the second coil.

Also, for example, a tip end of at least one suspension wire among at least said three suspension wire may be electrically connected to said second coil through said spring, the other end of at least said one suspension wire may be electrically connected to an external connection base plate included in said base portion.

The lens driving apparatus like this has simple structure and is suitable for small size, because electric power can be supplied from the base portion to the second coil through at least one suspension wire.

Also, said spring may include a B-spring arranged at a base side near said base portion in said lens portion and a F-spring arranged at an opposite side of said base side in said lens portion, the tip end of said at least one of said suspension wire may be electrically connected to said second coil through said F-spring.

The lens driving apparatus like this is available to support the focus portion with an appropriate force by elongating the length of the suspension wire, and is available to occupy a movable range of the focus portion.

Also, said at least three suspension wire may be composed of four suspension wires, said first driving portion can make said focus portion move to X-direction and Y-direction which are vertical direction to said light axis and mutually orthogonal, a rigidity to said X-direction of said four suspension wires and a rigidity to said Y-direction of said four suspension wires may be substantially equal, also, said at least three suspension wires may have a substantial circular shaped cross section respectively.

The lens driving apparatus like this is easy to control the first driving portion in blurring action and the like, because primary resonance frequencies of the X-direction and the Y-direction become equal, when driving the focus portion by the first driving portion. Also, it becomes easy to assemble suspension wires, by forming the cross section of the suspension wire in a substantial circular shape, because rigidity of a suspension wire 31 becomes substantially equal with respect to a rotating direction which an axis of the suspension wire is center.

Also, for example, the lens driving apparatus according to the present invention may be equipped to said focus portion, and may be arranged between said first magnet and said second magnet, and may include a magnet holding plate composed of a magnetic body.

The magnet holding plate arranged between the first magnet and the second magnet shutoff magnetism between the first magnet and the second magnet so that interference of respective magnetic field can be prevented. Therefore, the lens driving apparatus including the magnet holding plate like this is capable to drive the lens accurately.

For example, said magnet holding plate may have a ring shape wherein circumference is substantially rectangular, said first magnet may be composed of four rod-like magnets which are arranged at positions corresponding to respective sides of said magnet holding plate viewing from a direction of said light axis, said second magnet may be composed of four individual piece magnets arranged at positions corresponding to respective corners of said magnet holding plate viewing from a direction of said light axis.

By composing the first magnet with the rod-like magnets arranged at positions corresponding to respective sides of the magnet holding plate, the first driving portion becomes possible to generate further larger driving force. Against this, by composing the second magnet with the individual piece of magnets arranged at positions corresponding to respective corners of said magnet holding plate, a lens supporting device becomes capable to include further larger diameter lens. Therefore, the lens driving apparatus like this is suitable for downsizing further.

Preferably, an image sensor to detect light which comes through said lens portion is arranged on said base portion. By fixing the image sensor on the base portion, it becomes capable to move the lens portion to a direction vertical to the light axis or to a direction along the light axis to the image sensor. Namely, the lens portion is supported to cause a free movement to directions of three axes (three dimensions) to the image sensor.

Note that, in a structure wherein the image sensor is mounted to the lens portion (movable portion) and not to the base portion (fixed portion), one end of a flexible print circuit (FPC) must be connected to the movable portion and another end of the FPC must be connected to the fixed portion which is necessary, in order to take an output signal from the image sensor to the outside. In the structure like this, because a betweenness of the fixed portion and the movable portion is connected to the FPC, there is a risk to prevent movement of the lens portion which is a movable portion to the fixed portion, therefore, there is a risk that accuracy of blurring control tends to be lowered. Also, due to bending or extending of the FCP in response to the movement of the lens portion, a noise signal is generated so that there is a risk to lower the accuracy of the blurring control in this point.

Against this, in the present invention, it is not necessary to connect the betweenness of the movable portion and the fixed portion by FPC for transferring an image data by fixing the image sensor to the base portion (fixed portion). As a result, the movement of the lens portion which is movable portion to the fixed portion can be made smoothly as well as a noise signal generated by bending of the FPC and the like can be prevented so that the accuracy of blurring control can be increased. Also, by fixing the image sensor to the base portion (fixed portion), assembling the lens driving apparatus can become easier which contributes for reducing manufacturing cost.

DESCRIPTION OF THE PREFERRED EMBODIMENTS

First Embodiment

Figure 1:
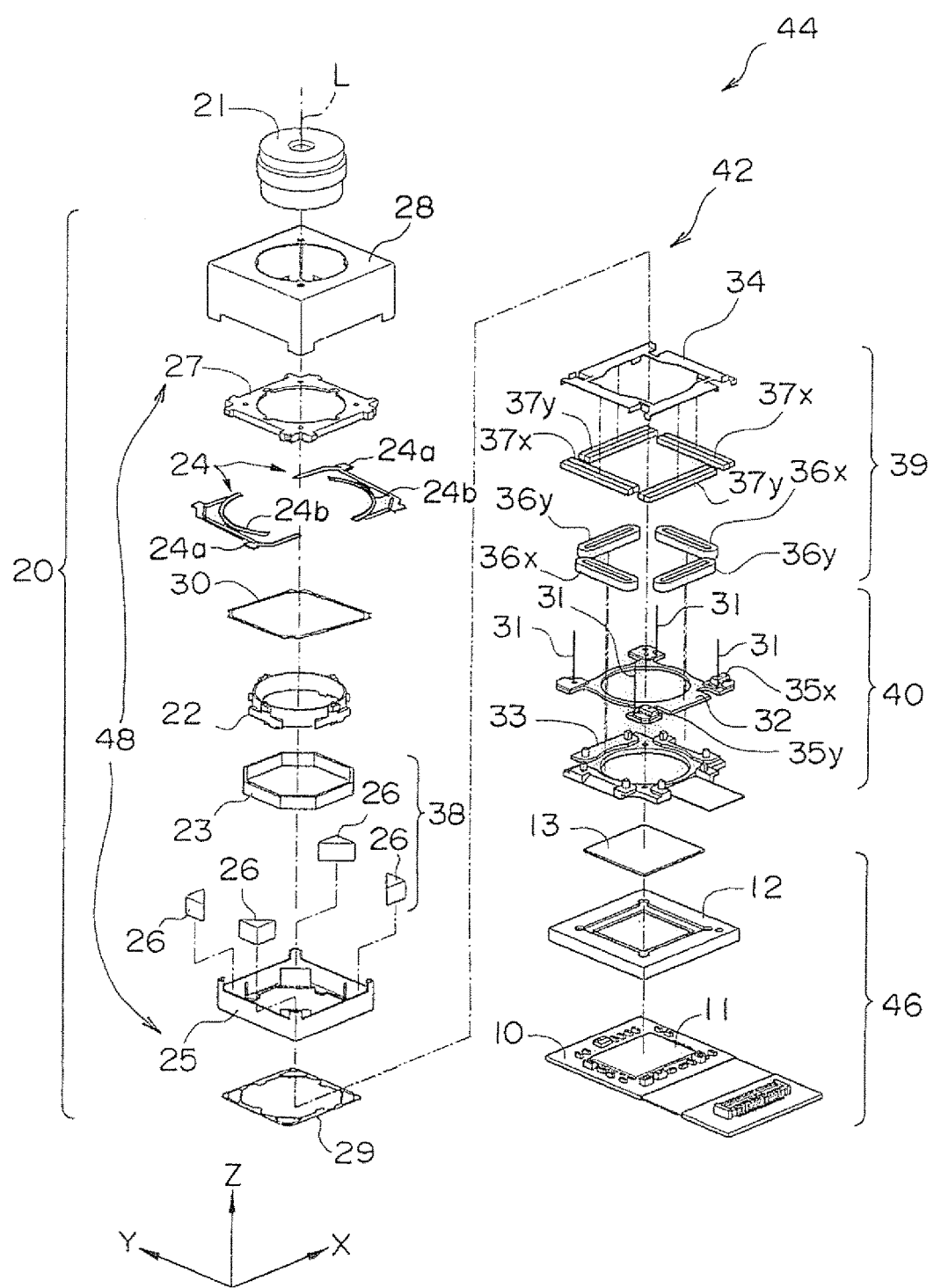
FIG. 1 is a perspective view of a disassembled camera unit including a lens driving apparatus according to one embodiment of the present invention.

FIG. 1 is a disassembled perspective view of a camera unit 44 including a lens driving unit 42 according to one embodiment of the present invention. The camera unit 44 is configured by the lens driving unit 42 and an image taking element unit 46. Note that, in explanation of the camera unit 44, as shown in the coordinate described in FIG. 1 to FIG. 5, it will be specified that along a direction of a light axis of a lens portion 21 included in the lens driving unit 42, a direction from an image sensor 11 to the lens portion 21 is defined as a positive direction of Z-axis, vertical directions to a light axis L of the lens portion 21 are defined as X-axis direction and Y-axis direction. Note that, the X-axis, Y-axis and Z-axis are vertical each other.

The image taking element unit 46 comprises a filter 13, a bracket 12, an image sensor 11, an image sensor base plate 10 and the like. The image sensor 11 is composed of a solid image taking element such as CCD, CMOS and the like, and it generates an image signal by photoelectric conversion. The image sensor 11 is mounted on a surface of Z-axis positive direction side of the image sensor base plate 10. The image signal generated at the image sensor 11 is transmitted to an arithmetic section and an information storage section through the image sensor base plate 10.

The bracket 12 and the filter 13 are arranged at the Z-axis positive direction side of the image sensor 11. The bracket 12 is fixed to the image sensor base plate 10, a light receiving surface of the image sensor 11 is protected by the bracket 12 and the filter 13. A rectangular shaped through hole is formed on the bracket 12 so as to pass through an image light. The filter 13 is composed of a transparent material and is mounted on the bracket 12 so as to block the through hole of the bracket 12.

A lens driving unit 42 is arranged at a Z-axis positive direction side of an image taking element unit 46. The lens driving unit 42 according to the present embodiment comprises a focus portion 20 including a lens portion 21 and an AF voice coil motor 38, a magnet holding plate 34, a blurring compensation voice coil motor 39, a suspension wire 31 and a base section 40.

As shown in FIG. 1, the base portion 40 is arranged at the Z-axis positive direction side of the bracket 12. The base portion 40 comprises a unit board 33 and a circuit board 32. It is preferable that the unit board 33 have a sufficient strength so that the circuit board 32 and the suspension wire 31 and the like which are arranged to the Z-axis positive direction side of the unit board 33 can be supported. As for materials of the unit board 33, although it is not particularly limited, for example, a resin material such as LCP (Liquid Crystal Polymer) and the like can be used. The unit board 33 is fixed to the bracket 12. The base portion 40, which includes the unit board 33, is equipped to the image taking element unit 46, which includes the image sensor 11, with fixing so as not to allow a relative movement to the image sensor 11.

The circuit board 32 comprises a wiring for transmitting electrical signals to the AF voice coil motor 38 and a blurring compensation voice coil motor 39. The circuit board 32 is composed of, for example, FPC(Flexible Printed Circuit) and the like. The circuit board 32 is fixed to the unit board 33 by adhering and the like and is supported by the unit board 33.

The circuit board 32 is electrically connected to a driving control section (not shown in drawings) which is provided at the lens driving unit 42 externally. Namely, the circuit board 32 has a role of an outside connecting base plate to relay electronic components in the lens driving unit 42 and the driving control section. The AF voice coil motor 38 and a blurring compensation voice coil motor 39 are driven and controlled by the driving control section so that the auto focus action and blurring compensation action can be realized appropriately. For example, a control signal from the driving control section is transmitted to an AF coil 23 (second coil), a X-direction blurring compensation coil (first coil) 36x and a Y-direction blurring compensation coil (first coil) 36y through the circuit board 32.

A X-direction position sensor 35x and a Y-direction position sensor 35y are provided on the circuit board 32. The X-direction position sensor 35x and Y-direction position sensor 35y detect a relative position of the focus portion 20 to the base portion 40. The X-direction position sensor 35x and Y-direction position sensor 35y are composed of, for example, a hall element and the like. The X-direction position sensor 35x and Y-direction position sensor 35y performs position detecting for the focus portion 20 by detecting a magnetic field variation caused by moving a X-direction blurring compensation magnet 37x and a Y-direction blurring compensation magnet 37y which are equipped to the focus portion 20.

The suspension wire 31 connects the base portion 40 and the focus portion 20 so as to allow a relative movement. The lens driving unit 42 according to the present embodiment comprises four suspension wires 31. Although a material for the suspension wire 31 is not particularly limited, phosphor bronze is preferable.

Also, number of the suspension wire 31 used for the lens driving unit 42 is preferably 3 or more, in view of connecting and supporting the base portion 40 and the focus portion 20 with good balance. In the present embodiment, the suspension wire 31 is provided at four corners of the lens driving unit 42 having an about rectangular shape viewing from a direction of the Z-axis. One tip end of the respective suspension wire 31 is fixed to the circuit board 32 or the unit board 33 of the base portion 40, a base end of the respective suspension wire 31 is fixed to a cap 27 or a F-spring 24 included in the focus portion 20. By fixing the suspension wire 31 to the cap 27 or F-spring 24 which are provided at the Z-axis positive direction side tip end of the focus portion 20, the focus portion 20 can be supported by an appropriate force with making elongated length of the suspension wire 31, a movable area of X-Y direction can be enlarged.

Also, in the present embodiment, the base portion 40 and the focus portion 20 are connected by four suspension wires 31, these four suspension wires have substantially equal rigidity to the X-axis direction and to the Y-axis direction. By making such constitution, primary resonance frequencies of the X-axis direction and the Y-axis direction becomes substantially equal, when the focus portion 20 is driven by a following mentioned blurring compensation voice coil motor 39, a relative positioning control of the focus portion 20 by the blurring compensation voice coil motor 39 becomes easier. Also, by making a cross section of the suspension wire 31 in a circular shape or a substantially circular shape which is close to the circular shape such as polygonal shape and the like, the rigidity of the suspension wire 31 becomes substantially uniform with respect to a rotating direction whose center is an axis of the suspension wire 31, it becomes easy to assemble the suspension wire 31.

Also, in the lens driving unit 42 according to the present embodiment, tip ends of two suspension wires 31 of the four suspension wires 31 are electrically connected to the AF coil 23 through the F-spring 24. Also, base ends of these two suspension wires 31 are electrically connected to the circuit board 32.

Namely, in the present embodiment, the F-spring 24 is electrically divided in two. One tip end of the AF coil 23 shown in FIG. 1 is electrically connected to one side of the divided F-spring 24, and is electrically connected to one tip end of the suspension wire 31 through one side of the F-spring 24. Contrary to this, the base end of the AF coil 23 is electrically connected to the other side of the divided F-spring 24, and is electrically connected to one tip end of other suspension wire 31, which is different from the suspension wire 31 connected to the AF coil 23 through the other side of the F-spring 24. Therefore, the lens driving unit 42 according to the present embodiment is able to provide electric power from the circuit board 32 of the base portion 40 to the AF coil 23 through the two suspension wires 31.

The blurring compensation voice coil motor 39 is provided on the Z-axis positive direction side of the base portion 40. The blurring compensation voice coil motor 39 causes a movement of the lens portion 21 to relatively to the base portion 40, along a direction which is vertical to the light axis L of the lens portion 21. The blurring compensation voice coil motor 39 according to the present embodiment causes a movement of the lens portion 21 relatively to the base portion 40 by moving the whole focus portion 20 which includes the lens portion 21 and the AF voice coil motor 38.

The blurring compensation voice coil motor 39 comprises a X-direction blurring compensation magnet 37x and a Y-direction blurring compensation magnet 37y which are equipped to the focus portion 20 through the magnet holding plate 34, a X-direction blurring compensation coil 36x and a Y-direction blurring compensation coil 36y which are equipped to the base portion 40. The x-direction blurring compensation coil 36x is arranged at the Z-axis negative direction side of the X-direction blurring compensation magnet 37x so as to face the X-direction blurring compensation magnet 37x. Also, the Y-direction blurring compensation coil 36y is arranged at the Z-axis negative direction side of the Y-direction blurring compensation magnet 37y so as to face the Y-direction blurring compensation magnet 37y.

The blurring compensation voice coil motor 39 comprises four coils 36x, 36y constituted by the two X-direction blurring compensation coil 36x and the two Y-direction blurring compensation coil 36y, and four magnets 37x, 37y constituted by the two X-direction blurring compensation magnet 37x and the two Y-direction blurring compensation magnet 37y. To the respective coils 36, electric current for driving the blurring compensation voice coil motor 39 is supplied from the circuit board 32.

The magnet holding plate 34 is arranged at the Z-axis positive direction side of the blurring compensation voice coil motor 39. The magnet holding plate 34 is mounted to the focus portion 20, in the present embodiment, it is fixed to a magnet supporting member 25. The magnet holding plate 34 is constituted by a magnetic body, for example iron, stainless and the like.

The magnet holding plate 34 is arranged, as shown in FIG. 1, between the AF magnet 26 arranged at the Z-axis positive direction side of the magnet holding plate 34 and the X-direction and Y-direction blurring compensation magnets 37x, 37y arranged at the Z-axis negative direction side of the magnet holding plate 34. Therefore, the magnet holding plate 34 prevents interference of magnetic fields of each other by blocking magnetism occurred between the magnets 37x, 37y included in the blurring compensation voice coil motor 39 and the magnet 26 included in the AF voice coil motor 38.

In the present embodiment, the magnet holding plate 34 has a ring shape in which a circumference thereof is substantially a rectangular shape. Also, the magnets 37x, 37y included in the blurring compensation voice coil motor 39 are composed of a rod-like magnet, the respective magnets 37x, 37y are arranged at positions corresponding to respective sides of the magnet holding plate 34.

Figure 2:
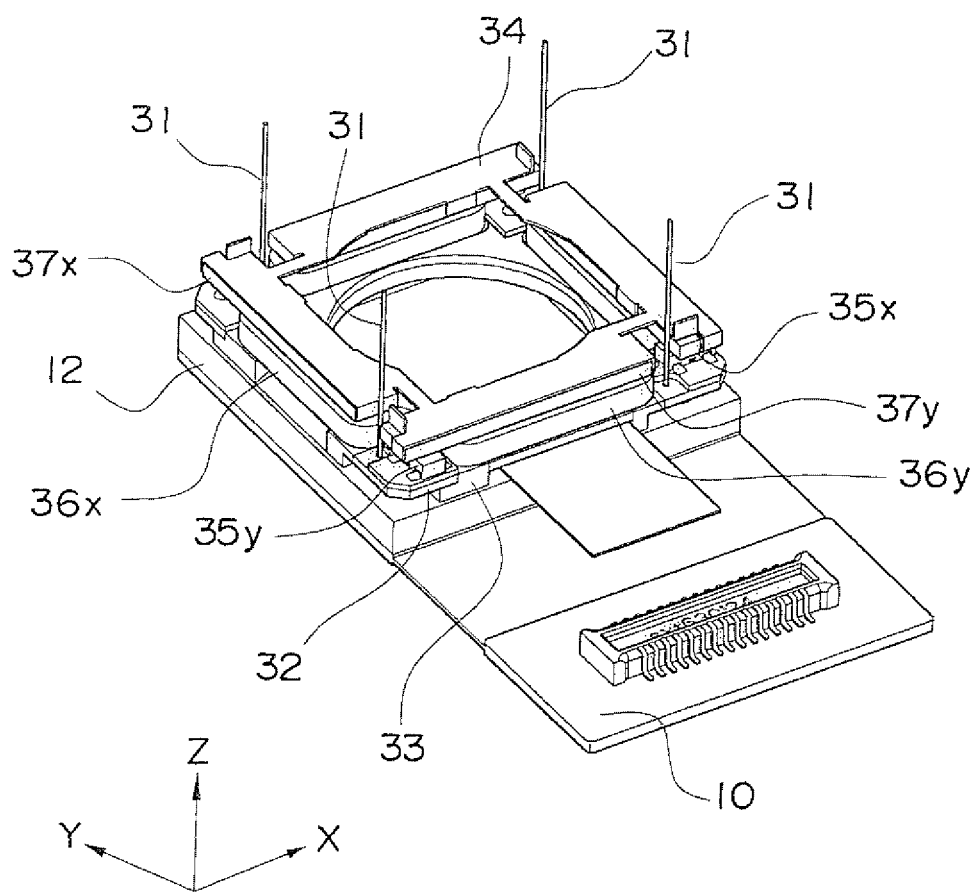
FIG. 2 is a partial assembly view showing arrangement of components near a blurring compensation voice coil motor in the camera unit shown in FIG. 1.

FIG. 2 is a partial assembly view showing an arrangement of components near the blurring compensation voice coil motor 39 in the camera unit 44 shown in FIG. 1. The magnets 37x, 37y and coils 36x, 36y included in the blurring compensation voice coil motor 39 shown in FIG. 1 are arranged as shown in FIG. 2, after the camera unit 44 is assembled. Note that the focus portion 20 is not shown in FIG. 2.

In FIG. 2, the magnet holding plate 34, the X-direction and Y-direction blurring compensation magnets 37x, 37y fixed to the magnet holding plate 34 are not fixed to other components shown in FIG. 2. Namely, in the camera unit 44 shown in FIG. 1, the blurring compensation voice coil motor 39 causes a movement of the focus portion 20 arranged at the Z-axis positive direction side of the magnet holding plate 34 relatively to a direction along a XY plane against the image taking element unit 46 and the base portion 40.

As shown in FIG. 1, the focus portion 20 is arranged at the Z-axis positive direction side of the magnet holding plate 34.

The focus portion 20 comprises the lens portion 21, the AF voice coil motor 38, the F-spring 24, a B-spring 29, the focus base 48, a coil holder 22 and the like.

The focus base 48 according to the present embodiment is constituted by a magnet supporting member 25 and the cap 27. An AF magnet 26 included in the AF voice coil motor 38 is fixed to the magnet supporting member 25. Also, the X-direction blurring compensation magnet 37x and the Y-direction blurring compensation magnet 37y are equipped to the magnet supporting member 25 through the magnet holding plate 34.

Figure 3:
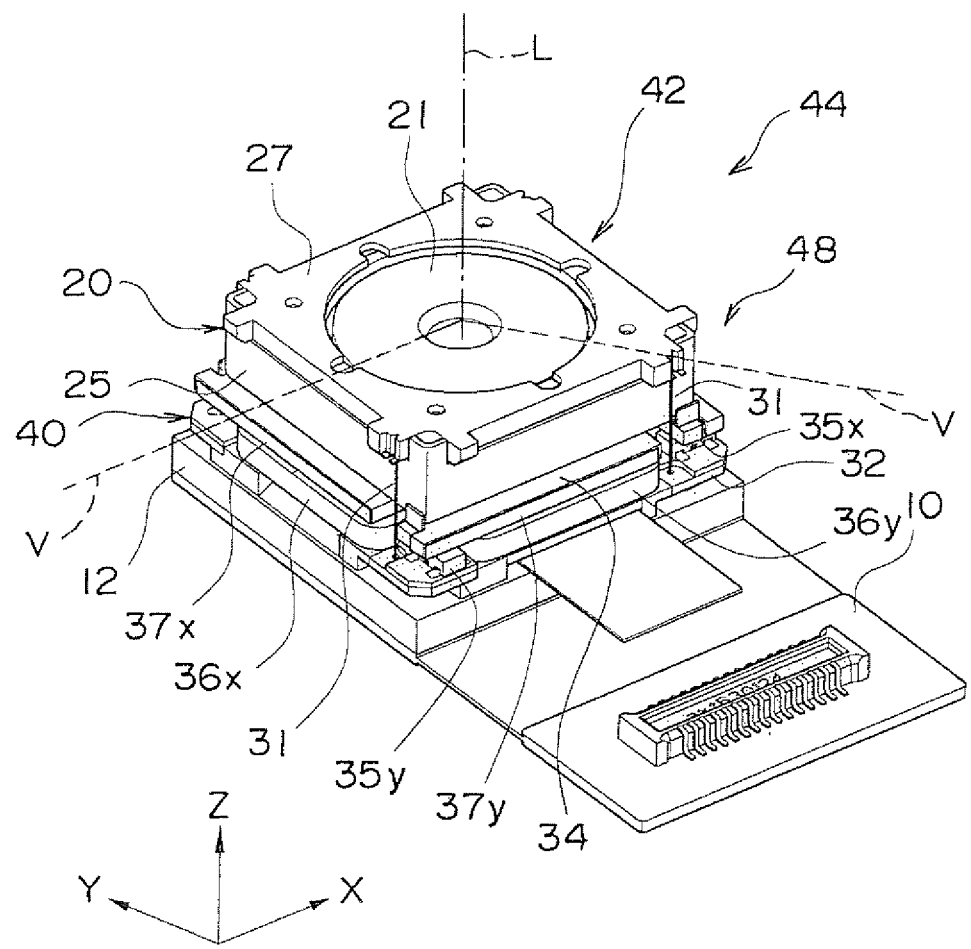
FIG. 3 is a perspective view of the camera unit shown in FIG. 1.

Also, the cap 27 and the magnet supporting member 25 are, as shown in FIG. 3, fixed each other after assembling the camera unit 44 to constitute a focus base 48. Note that, the cap 27 may be equipped to the magnet supporting member 25 through the F-spring 24 and an insulation sheet 30 shown in FIG. 1.

As shown in FIG. 1, the lens portion 21 and the AF voice coil motor are received in the focus base 48. The lens portion 21 includes at least one lens, and forms an image by the image light on a light receiving surface of the image sensor 11 arranged at the Z-axis positive direction side of the lens portion 21.

The AF voice coil motor 38 causes the lens portion 21 relatively moving to the base portion 40 along the light axis L of the lens portion 21. Here, the AF voice coil motor 38 according to the present embodiment causes a movement of the lens portion 21 relatively to the light axis direction against the focus base 48. However, as mentioned below, the focus base 48 is connected and supported by the suspension wires 31 to the base portion 40. Therefore, the AF voice coil motor 38 can make the lens portion 21 move relatively to the base portion 40 and the image sensor 11 consequently by causing a movement of the lens portion 21 relatively to the focus base 48.

The AF voice coil motor 38 comprises an AF coil 23 equipped to the lens portion 21 and an AF magnet 26 equipped to the focus base 48. The AF magnet 26 is, as shown in FIG. 1, fixed to the magnet supporting member 25, and is arranged to face the AF coil 23 after assembling. The AF magnet 26 is constituted by four individual piece magnets, each individual piece magnets are arranged as surrounding the AF magnet 26 along a circumference direction of the lens portion 21. The individual piece magnets to constitute the AF magnet 26 are arranged at positions corresponding to respective corners of said magnet holding plate 34 viewing from a direction of said light axis (Z-axis direction).

Although the AF coil 23 may be fixed to the lens portion 21 directly, it may be fixed through a coil holder 22 as it is like the lens driving unit 42 according to the present embodiment. The coil holder 22 has a hollow cylindrical shape and includes a portion to fix the lens portion 21 and a portion to fix the AF coil 23. The AF coil 23 which is polygonal (octagonal) can be attached certainly to the cylindrical shape lens portion 21 by the coil holder 22.

Figure 5:
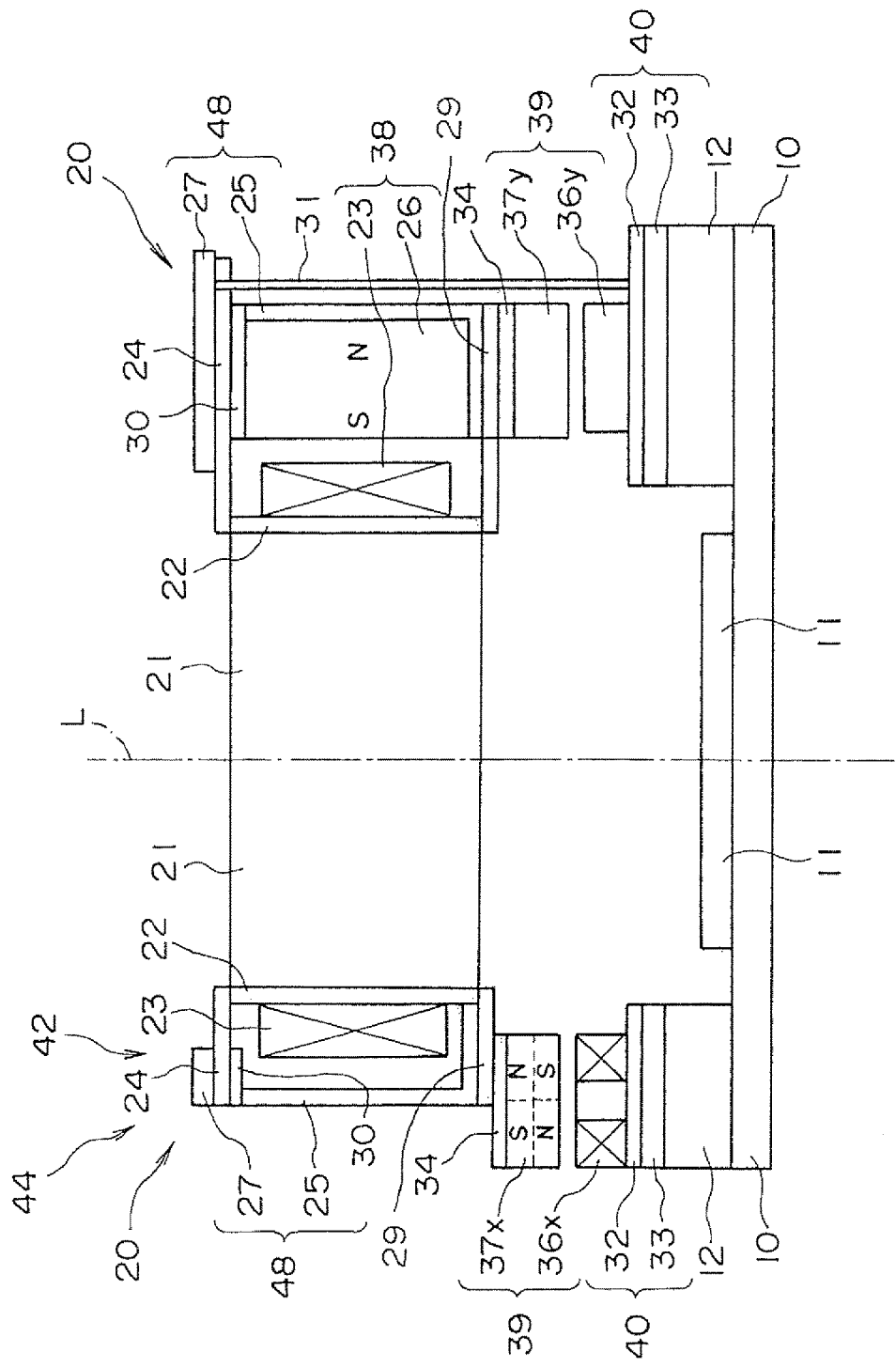
FIG. 5 is a schematic cross sectional view showing the camera unit shown in FIG. 3.

The lens driving unit 42 according to the present embodiment comprises the B-spring 29 equipped to a base portion 40 side in the lens portion 21 (Z-axis negative direction side) and the F-spring 24 equipped to an opposite side (Z-axis positive direction side) to the base portion 40 in the lens portion 21. The B-spring 29 and the F-spring 24 connect the focus base 48 and the lens portion 21 as relatively movable along the light axis direction L of the lens portion 21, as shown in FIG. 5. The F-spring 24 comprises, as shown in FIG. 1, an outer circumferential portion 24a fixed with the focus base 48 and an inner circumferential portion 24b fixed with the lens portion 21. The outer circumferential portion 24a may be fixed to the magnet supporting member 25 or the cap 27 directly to compose the focus base 48 or may be fixed to the focus base 48 indirectly by fixing to the AF magnet 26 which is fixed to the magnet supporting member 25 through an insulation sheet 30.

Although the inner circumferential portion 24b may be fixed to the lens portion 21 directly, it may be fixed to the lens portion 21 indirectly by fixing to the coil holder 22 which is fixed to the lens portion 21. The B-spring 29 is fixed to the focus base 48 and the lens portion 21 directly or indirectly as similar with the F-spring 24. The B-spring 29 and the F-spring 24 are preferably constituted by a resilient material so as to make relatively movable of the focus base 48 and the lens portion 21 along the light axis direction of the lens portion 21.

The F-spring 24 in the present embodiment is constituted by a resilient material having conductive characteristic. Although a material to constitute the F-spring 24 is not particularly limited, for example, metallic material such as copper, beryllium or allows including thereof may be used. The inner circumferential portion 24b of the F-spring 24 is electrically connected to the AF coil 23 fixed to the coil holder 22. Therefore, the lens driving unit 42 is capable to supply electric power from the circuit board 32 of the base portion 40 to the AF coil 23 through the two suspension wires 31 and the F-spring 24.

The one tip end of the AF coil 23 shown in FIG. 1 is electrically connected to one of the divided F-spring 24, and is electrically connected to the one tip end of the suspension wire 31 through the one side of the F-spring 24. Contrary to this, base end of the AF-coil 23 is electrically connected to another end of the divided F-spring 24, and is electrically connected to the base end of the suspension wire 31 which is different from the suspension wire 31 to which the AF-coil is connected, through the other side of the F-spring 24. Therefore, the lens driving unit 42 according to the present embodiment is capable to supply electric power from the circuit board 32 of the base portion 40 to the AF coil 23 through the two suspension wires 31. Note that, in case that the electric power is supplied to the AF coil 23 through the F-spring, it is preferably to sandwich the insulation sheet 30 between the magnet and the F-spring 24.

The cap 27 is mounted to the Z-axis positive direction side of the magnet supporting member 25. The F-spring 24, the AF voice coil motor 38, the lens portion 21 and the like are received at the Z-axis negative direction side of the cap 27. The base end of the suspension wire 31 is fixed to the cap 27 through the F-spring 24 or directly. Note that, the camera unit 44 may comprise a cover 28 for covering the image taking element unit 46 and the lens driving unit 42.

FIG. 3 is a perspective view of the camera unit 44 shown in FIG. 1 after assembled. Note that, the cover 28 in FIG. 1 is not shown in FIG. 3. An outer shape of the lens driving unit 42 is a rectangular shape, the suspension wires 31 are arranged to four corners of the lens driving unit 42. The one tip end of the suspension wire 31 is fixed to the base portion 40, as shown in FIG. 3, the base end of the suspension wire 31 is fixed to the magnet supporting member 25 of the focus base 48 or to the cap 27.

Because the suspension wire 31 supports a betweenness of the focus base 48 and the base portion 40, the X-direction blurring compensation magnet 37x mounted to the focus base 48 and the X-direction blurring compensation coil 36x are arranged to the Z-axis direction as facing each other with sandwiching a slight space. Similarly, the Y-direction blurring compensation magnet 37y and the Y-direction compensation coil 36y are also arranged to the Z-axis direction as facing each other with sandwiching a slight space.

Figure 4:
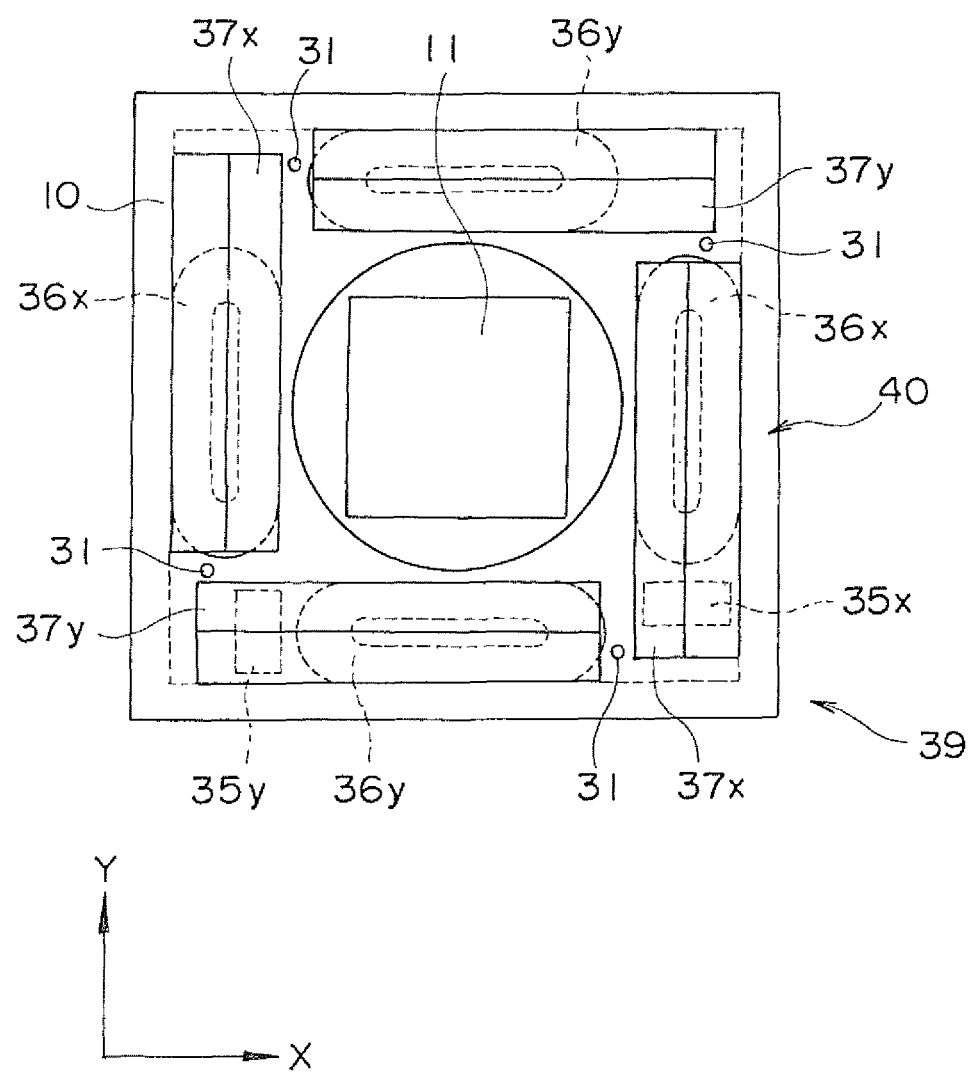
FIG. 4 is a schematic plane view for explaining a constitution of the blurring compensation voice coil motor included in the camera unit shown in FIG. 3.

FIG. 4 is a schematic plane view for explaining a constitution of the blurring compensation voice coil motor 39, a positioning relation of the blurring compensation voice coil motor 39 and the image sensor 11 in FIG. 1 is observed from the Z-axis positive direction side. The two pairs of X-direction blurring compensation magnets 37x and coils 36x which are arranged as sandwiching the image sensor 11 to the X-axis direction cause to relative move the whole body of the focus portion 20 shown in FIG. 3 to the X-axis direction against the base portion 40.

Also, as shown in FIG. 4, the two pairs of Y-direction blurring compensation magnets 37y and coils 36y which are arranged as sandwiching the image sensor 11 to the Y-axis direction cause to a movement of whole body of the focus portion 20 shown in FIG. 3 relatively to the Y-axis direction against the base portion 40. Thereby, the blurring compensation voice coil motor 39 is capable to make the movement of the whole body of focus portion 20 shown in FIG. 3 relatively to arbitral directions along the XY plane to the base portion 40.

As shown in FIG. 3 and FIG. 4, the X-direction position sensor 35x mounted to the base portion 40 is arranged to the X-direction blurring compensation magnet 37x mounted to the focus base 48 as facing each other with sandwiching a slight space to the Z-axis direction which is similar with the X-direction blurring compensation coil 36x. Also, the Y-direction position sensor 35y is arranged to the Y-direction blurring compensation magnet 37y as facing each other with sandwiching a slight space to the Z-axis direction each other.

The drive control section (not shown) to control the lens driving unit 42 shown in FIG. 1 detects a position of the focus portion 20 or the lens portion 21 based on detected signals of the X-direction position sensor 35x and the Y-direction position sensor 35y. The lens driving unit 42 according to the present embodiment can perform high accurate blurring compensation operation by detecting the position of the lens portion 21 and driving the blurring compensation voice coil motor 39 on the basis of this.

FIG. 5 is a schematic cross sectional view of the camera unit 44 observed by a cross section through which the light axis L and a V-V line shown in FIG. 3. In FIG. 5, a left side portion from the light axis L shows a cross section through which the light axis L and the XY plane surface are passing, a right side portion from the light axis L shows a cross section through which the light axis L and the suspension wire 31 are passing. Note that, FIG. 5 is a schematic view for specifying the driving motion of the lens portion 21, shapes of each member are shown as simplified, also indication of some parts are omitted.

As shown in FIG. 5, the lens portion 21 is supported by the F-spring 24 and the B-spring 29 as relatively movable along the light axis L to the focus base 40. The lens portion 21 is driven by the AF voice coil motor 38 so as to make a movement relative to the focus base 48 along the light axis L. The AF voice coil motor 38 comprises The AF coil 23 equipped to the lens portion 21 through the coil holder 22 and AF magnet 26 equipped to the magnet supporting member 25 of the focus base 48.

In this manner, the lens driving unit 42 according to the present embodiment connects the focus base 48 and the lens portion 21 as relatively movable by using the F-spring 24 and the B-spring 29, and the AF voice coil motor 38 is arranged between the lens portion 21 and the focus base 48. Thereby, the lens driving unit 42 according to the present embodiment is capable to cause a moving of the lens portion 21 along the light axis L accurately, in spite of having very simple structure.

As shown in FIG. 5, in the lens driving unit 42 according to the present embodiment, the lens portion 21, the AF voice coil motor 38 and the focus base 48 constitute the focus portion 20 which is capable to perform focus action. Namely, the AF voice coil motor 38 of the focus portion 20 is capable to adjust the focal distance of camera unit 44 by making a movement of the lens portion 21 relatively to the light axis L against the base portion 40.

The focus portion 20 is supported as relatively movable to the base portion 40 along the vertical direction to the light axis L by the four suspension wires 31. The focus portion 20 is driven by the blurring compensation voice coil motor 39 so as to make a movement along the vertical direction relatively to the light axis L against the base portion 40. The blurring compensation voice coil motor 39 comprises the X-direction and the Y-direction blurring compensation magnets 37x, 37y which are equipped to the focus portion 20 through the magnet holding plate 34, and the X-direction and Y-direction blurring compensation coils 36x, 36y which are equipped to the base portion 40.

In this manner, the lens driving unit 42 according to the present embodiment connects the focus portion 20 and the base portion 40 as relatively movable by using four suspension wires 31, and the blurring compensation voice coil motor 39 is arranged between the focus portion 30 and the base portion 40. Thereby, the lens driving unit 42 according to the present embodiment is capable to cause a movement of the lens portion 21 along the light axis L accurately, in spite of having very simple structure.

Therefore, the lens driving unit 42 is capable to perform blurring compensation by using the blurring compensation voice coil motor 39 so as to compensate the blurring added to the camera unit 44 according to drive the lens portion 21. Further, in the lens driving unit 42 according to the present embodiment, the blurring compensation voice coil motor 39 causes a movement of the whole focus portion 20 to the direction vertical to the light axis L. Therefore, in the lens driving unit 42 according to the present embodiment, one lens portion 21 can serve both as lens for focusing which is used for auto-focus etc. and lens for the blurring compensation. Therefore, the lens driving unit 42 according to the present embodiment is capable to reduce number of components and simplify its structure, having high function and appropriate for downsizing.

As shown in FIG. 5, the X-direction and the Y-direction blurring compensation magnets 37x, 37y are equipped to the base portion of the Z-axis negative direction side of the focus portion 20 through the magnet plate 34. The magnet holding plate 34 is composed of a magnetic body and is arranged between the X-direction and the Y-direction blurring compensation magnets 37x, 37y and the AF magnet 26.

The magnet holding plate 34 blocks magnetism between the X-direction and the Y-direction blurring compensation magnets 37x, 37y and the AF magnet 26 so that interference of each magnetic field can be protected. Therefore, the lens portion 21 can be driven accurately by the lens driving unit 42 according to the present embodiment. Also, it is possible to locate the X-direction and the Y-direction blurring compensation magnets 37x, 37y and the AF magnet 26 adjacently by the blocking effect of the magnet holding plate 34, it is appropriate for downsizing, in view of this.

As shown in FIG. 1 and FIG. 5, the AF magnet 26 is composed of four individual piece of magnets arranged at positions corresponding to respective corners of the magnet holding plate 34. The AF coil 23 must be arranged, as shown in FIG. 5, at an inner circumferential side of the AF magnet 26. However, the lens driving unit 42 according to the present embodiment becomes capable to include the lens portion 21 having larger diameter by arranging the AF magnet 26 at the corners so that it is appropriate for downsizing. p Also, as shown in FIG. 1, FIG. 4 and FIG. 5, the X-direction and the Y-direction blurring compensation magnets 37x, 37y are composed of four rod-like magnets which are arranged at positions corresponding to respective sides of the magnet holding plate 34. Here, the X-direction and the &-direction blurring compensation magnet coils 36x, 36y are arranged at the Z-axis negative direction side to the X-direction and the Y-direction blurring magnet 37x, 37y, not on an inner circumferential side.

Therefore, it is possible to increase a driving force by enlarging a facing area of the magnets and the coils in the blurring compensation voice coil motor 39 with maintaining the whole body as small, from this point, it is appropriate for downsizing too. Also, since the blurring compensation voice coil motor 39 causes a movement of whole body of the focus portion 20, it is preferable to have larger driving force than that of the AF voice coil motor 38. Note that, the X-direction blurring compensation magnet 37x is magnetized in-face two pole to the X-direction corresponding to the X-direction blurring compensation coil 36x (refer to FIG. 5), similarly, the Y-direction blurring compensation magnet 37y is magnetized in-face two pole to the Y-direction corresponding to the Y-direction blurring compensation coil 36Y.

Also, tip ends of the two suspension wires 31 among the four suspension wires 31 shown in FIG. 1 are electrically connected to the AF coil 23 through the F-spring 24 shown in FIG. 5. Also, base ends of the two suspension wires 31 are electrically connected to the circuit board 32. Therefore, the lens driving unit 42 according to the present embodiment is capable to supply electric power from the circuit board 32 of the base portion 40 to the AF coil 23 through the two suspension wires 31, and has simple structure as well as appropriate for downsizing.

Further, in the present embodiment, the lens portion 21 is supported to the image sensor 11 as freely movable to directions of three axis (three dimensional) by fixing the image sensor 11 to the base portion 40 (fixing portion). Also, in the present embodiment, it is not necessary to connect a betweenness of the movable portion and the fixed portion by FPC for transferring an image data, it is possible to make smooth moving the focus portion 20 which is the movable portion to the image sensor 11, and it is possible to prevent a noise signal caused by bending and the like of the FPC so that accuracy of the blurring compensation control can be increased. Also, it becomes easy to assemble the lens driving unit 42 by fixing the image sensor 11 to the base portion 40(fixed portion) which contributes for reducing manufacturing cost.

Other Example

In the above mentioned embodiment, although the blurring compensation voice coil motor 39 causes to move the lens portion 21 and the AF voice coil motor 38, as for the lens driving unit according to the present invention, it is not limited thereto. For example, a lens driving unit may be that available that an AF voice coil motor causes to move the lens portion 21 and a blurring compensation voice coil motor. Also, in the above mentioned embodiment, as for the driving portion to move the lens portion 21, although a voice coil motor is adopted, a driving portion other than the voice coil motor may be adopted.

The invention claimed is:

1. A lens driving apparatus comprising:
   a lens holder supporting a lens,
   an image sensor arranged in parallel along a light axis to the lens,
   a supporting portion relatively movably connecting a base portion of a fixing portion and a magnet supporting member,
   a first driving portion configured to move the magnet supporting portion relatively to the base portion,
   a second driving portion configured to move the lens holder relatively to the image sensor, and
   a magnetism blocking member arranged between the first driving portion and the second driving portion.

2. The lens driving apparatus as set forth in claim 1, wherein
   the second driving portion moves the lens holder along a direction of the light axis.

3. The lens driving apparatus as set forth in claim 1, wherein
   the first driving portion moves the magnet supporting member to a vertical direction to the light axis.

4. The lens driving apparatus as set forth in claim 3, wherein
   the first driving portion has a first coil and a first magnet arranged in parallel with a predetermined space along the light axis.

5. The lens driving apparatus as set forth in claim 2, wherein
   the second driving portion has a second coil and a second magnet arranged in parallel with a predetermined space along a vertical direction to the light axis.

6. The lens driving apparatus as set forth in claim 1, further comprising a resilient body connecting the supporting portion and the magnet supporting member.

7. The lens driving apparatus as set forth in claim 1, wherein
   the supporting portion has a wire shape and extends in a direction of the light axis.

8. The lens driving apparatus as set forth in claim 6, wherein
   the resilient body has a plate shape and extends a vertical direction to the light axis.

9. The lens driving apparatus as set forth in claim 1, further comprising a position sensor configured to detect a relative position between the magnet supporting member and the base portion,
   wherein the magnetism blocking member is arranged between the position sensor and the second driving portion.

10. A driving apparatus comprising:
    an X-axis, a Y-axis, and a Z-axis vertical to each other,
    a lens holder supporting a lens,
    an image sensor arranged in parallel along the Z-axis to the lens,
    a base portion with a circuit board,
    a magnet supporting member arranged in parallel along the Z-axis to the base portion,
    a first driving portion configured to move the magnet supporting member relatively to the base portion,
    a second driving portion configured to move the lens holder relatively to the image sensor, and
    a magnetism blocking member arranged between the first driving portion and the second driving portion.

11. The driving apparatus as set forth in claim 10, wherein
    the first driving portion has a first coil and a first magnet arranged in parallel with a predetermined space along the Z-axis, and
    the circuit board is electrically connected to the first coil.

* * * * *